(12) United States Patent
Myers et al.

(10) Patent No.: US 12,077,091 B2
(45) Date of Patent: Sep. 3, 2024

(54) METHOD AND APPARATUS FOR SETTING, MONITORING, USAGE TRACKING AND/OR LIFECYCLE MANAGEMENT OF CARGO RESTRAINTS

(71) Applicant: J.J. Keller & Associates, Inc., Neenah, WI (US)

(72) Inventors: Steven Duane Myers, Lee's Summit, MO (US); Kevin Roger Kucksdorf, Hortonville, WI (US); Joel Clark, Sherwood, WI (US); Tyler Picker, Tyler, TX (US)

(73) Assignee: J.J. Keller & Associates, Inc., Neenah, WI (US)

( * ) Notice: Subject to any disclaimer, the term of this patent is extended or adjusted under 35 U.S.C. 154(b) by 948 days.

(21) Appl. No.: 17/066,214

(22) Filed: Oct. 8, 2020

(65) Prior Publication Data

US 2022/0111784 A1    Apr. 14, 2022

(51) Int. Cl.
*B60P 7/08* (2006.01)
*G07C 3/02* (2006.01)
*G08C 17/02* (2006.01)

(52) U.S. Cl.
CPC .............. *B60P 7/0861* (2013.01); *G07C 3/02* (2013.01); *G08C 17/02* (2013.01)

(58) Field of Classification Search
None
See application file for complete search history.

(56) References Cited

U.S. PATENT DOCUMENTS

| | | |
|---|---|---|
| 5,295,664 A | 3/1994 | Kamper |
| 7,112,023 B1 | 9/2006 | Tardif |
| 7,972,099 B2 | 7/2011 | Leggett et al. |
| 8,506,220 B2 | 8/2013 | Morland |
| 9,228,911 B1 | 1/2016 | Meyers |
| 9,527,424 B1 | 12/2016 | Sarnowski |
| 10,077,570 B2 | 9/2018 | Underwood et al. |
| 10,132,911 B1 | 11/2018 | Bullock |
| 10,239,439 B2 | 3/2019 | Cooper |
| 10,288,505 B2 | 5/2019 | Miyata |
| 10,315,555 B2 | 6/2019 | Bruhn |
| 10,328,840 B2 | 6/2019 | White et al. |
| 10,328,841 B2 | 6/2019 | Bika et al. |
| 10,328,842 B2 | 6/2019 | McNally |
| 10,391,920 B2 | 8/2019 | Squires |
| 11,208,027 B1 * | 12/2021 | Rainone .................. G01L 5/101 |
| 2007/0269285 A1 | 11/2007 | Leggett |
| 2010/0158629 A1 * | 6/2010 | Morland ............... B60P 7/0861 410/98 |
| 2012/0260740 A1 | 10/2012 | Huguenot |
| 2013/0160254 A1 | 6/2013 | Stoddard |
| 2013/0162420 A1 | 6/2013 | Stoddard |
| 2017/0313233 A1 * | 11/2017 | McNally ............... B60P 7/0861 |
| 2018/0319312 A1 * | 11/2018 | Cooper .................... G01L 5/10 |
| 2019/0001863 A1 * | 1/2019 | Taylor .................... H04W 4/70 |
| 2020/0031269 A1 | 1/2020 | Chu |

* cited by examiner

*Primary Examiner* — Abdhesh K Jha
*Assistant Examiner* — Jonathan E Reinert
(74) *Attorney, Agent, or Firm* — Wong Meyer Smith & McConnell

(57) ABSTRACT

A method and apparatus for setting and monitoring the tension of a cargo restraint and for tracking the usage of and monitoring the lifecycle of a cargo restraint.

10 Claims, 10 Drawing Sheets

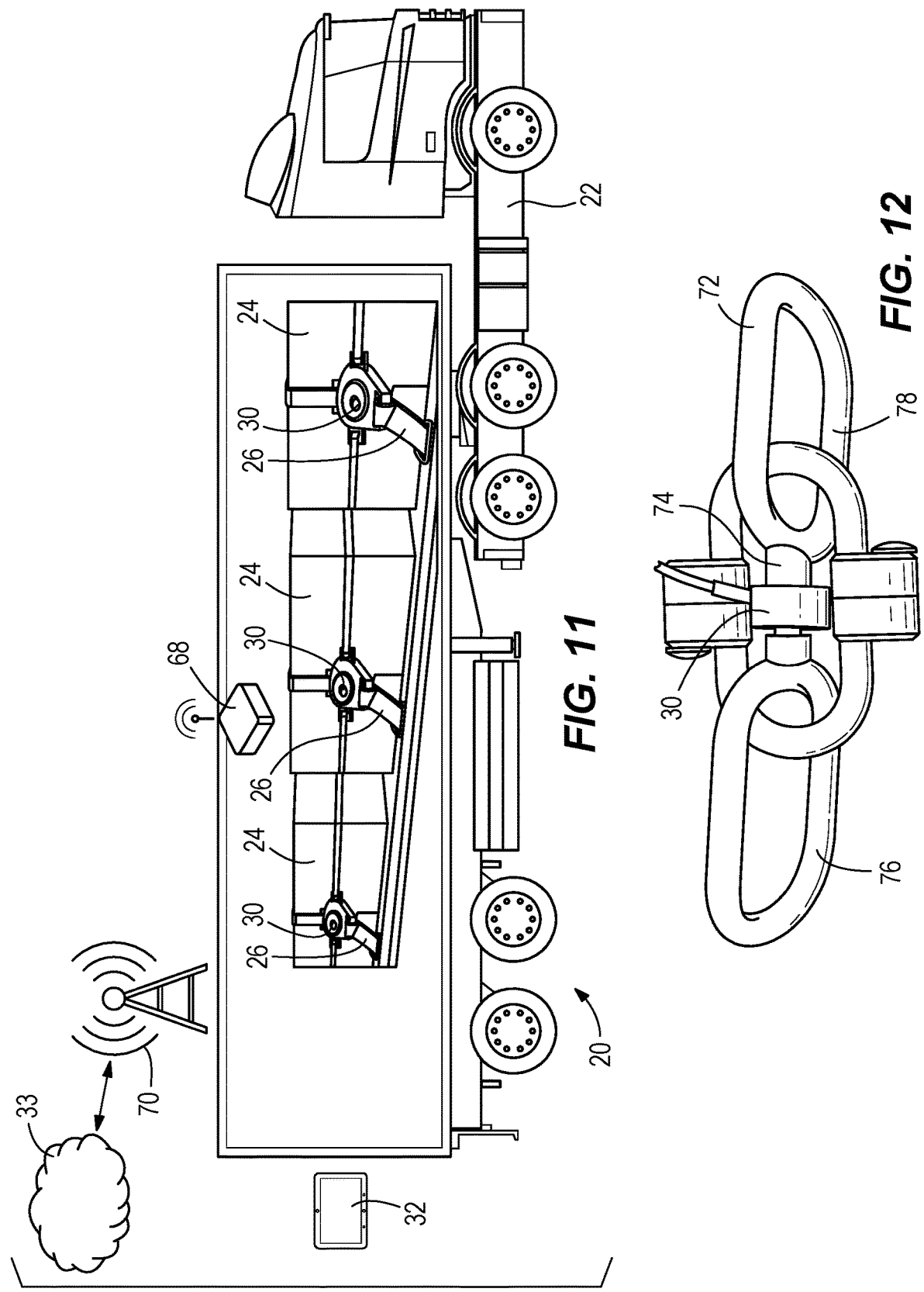

METHOD AND APPARATUS FOR SETTING, MONITORING, USAGE TRACKING AND/OR LIFECYCLE MANAGEMENT OF CARGO RESTRAINTS

FIELD OF THE INVENTION

The present invention relates to cargo restraints, and more specifically, relates to setting the tension of, monitoring the tension of, usage tracking of and/or lifecycle management of cargo restraints.

BACKGROUND OF THE INVENTION

When a load in transport shifts or is not secured properly, it can be a safety hazard causing vehicle damage, cargo damage, and/or rollovers or accidents. This can result in injuries or fatalities. Traditional cargo restraints (e.g. straps, load bars, nets, and chains) do not communicate with a user to alert the user of cargo restraint failures, potential failures or changes in tension during or after load transport.

SUMMARY OF THE INVENTION

In one construction, the disclosure provides a tension monitoring system for use with a cargo restraint comprising a tension monitor including a housing, a pressure plate, a load cell and at least one channel, wherein when a cargo restraint is fed through the at least one channel, the pressure plate and load cell are adapted to determine a tension measurement relating to how much tension the cargo restraint is under; and a remote device in wireless communication with the tension monitor and adapted to receive the tension measurement.

In another construction, the disclosure provides a method for monitoring tension of a cargo restraint comprising the steps of attaching a tension monitor to a cargo restraint, the tension monitor including housing, a pressure plate, a load cell and at least one channel, wherein a cargo restraint is fed through the at least one channel; putting the cargo restraint under tension using a tensioning mechanism; measuring the tension of the cargo restraint with the tension monitor while using the tensioning mechanism, the pressure plate and load cell being adapted to measure the tension of the cargo restraint; sending a user an alert when a pre-set initial tension measurement is reached; continually monitoring the tension of the cargo restraint with the tension monitor; and sending the user an alert if the measured tension of the cargo restraint is outside a pre-set range.

In another construction, the disclosure provides a cargo restraint lifecycle monitoring system comprising an intelligent device securable to a cargo restraint and capable of storing data relating to the cargo restraint; a tension monitor securable to the cargo restraint, capable of reading and writing data to and from the intelligent device, and capable of taking a measurement of the tension of the cargo restraint; and a remote device in wireless communication with the tension monitor and adapted to receive the tension measurements and the data relating to cargo restraint.

In another construction, the disclosure provides a cargo restraint lifecycle monitoring method comprising the steps of attaching an intelligent device to a cargo restraint; attaching a tension monitor to the cargo restraint; reading and writing data to the intelligent device using the tension monitor; collecting data relating to cargo restraint uses; collecting tension data from the tension monitor; accumulating the collected data; and allowing a user to access the collected data.

In another construction, the disclosure provides a method for monitoring the lifecycle of a cargo restraint comprising the steps of attaching an intelligent device to a cargo restraint; writing data to the intelligent device; reading data from the intelligent device; collecting data relating to cargo restraint uses; accumulating the gathered data; and allowing a user to access the gathered data.

In another construction, the disclosure provides a method for monitoring uses of a cargo restraint comprising the steps of attaching an intelligent device to a cargo restraint; writing data to the intelligent device; reading data from the intelligent device; collecting data relating to cargo restraint uses; accumulating the gathered data; and analyzing the gathered data to determine the predicted lifecycle of the cargo restraint.

Other aspects of the disclosure will become apparent by consideration of the detailed description and accompanying drawings.

BRIEF DESCRIPTION OF THE DRAWINGS

FIG. 11 is a perspective view of another embodiment of the tension monitoring system;

FIG. 12 is a perspective view of the tension monitor used with a chain type cargo restraint;

DETAILED DESCRIPTION

Before any constructions of the disclosure are explained in detail, it is to be understood that the disclosure is not limited in its application to the details of construction and the arrangement of components set forth in the following description or illustrated in the following drawings. The disclosure is capable of other constructions and of being practiced or of being carried out in various ways.

Figure 1:
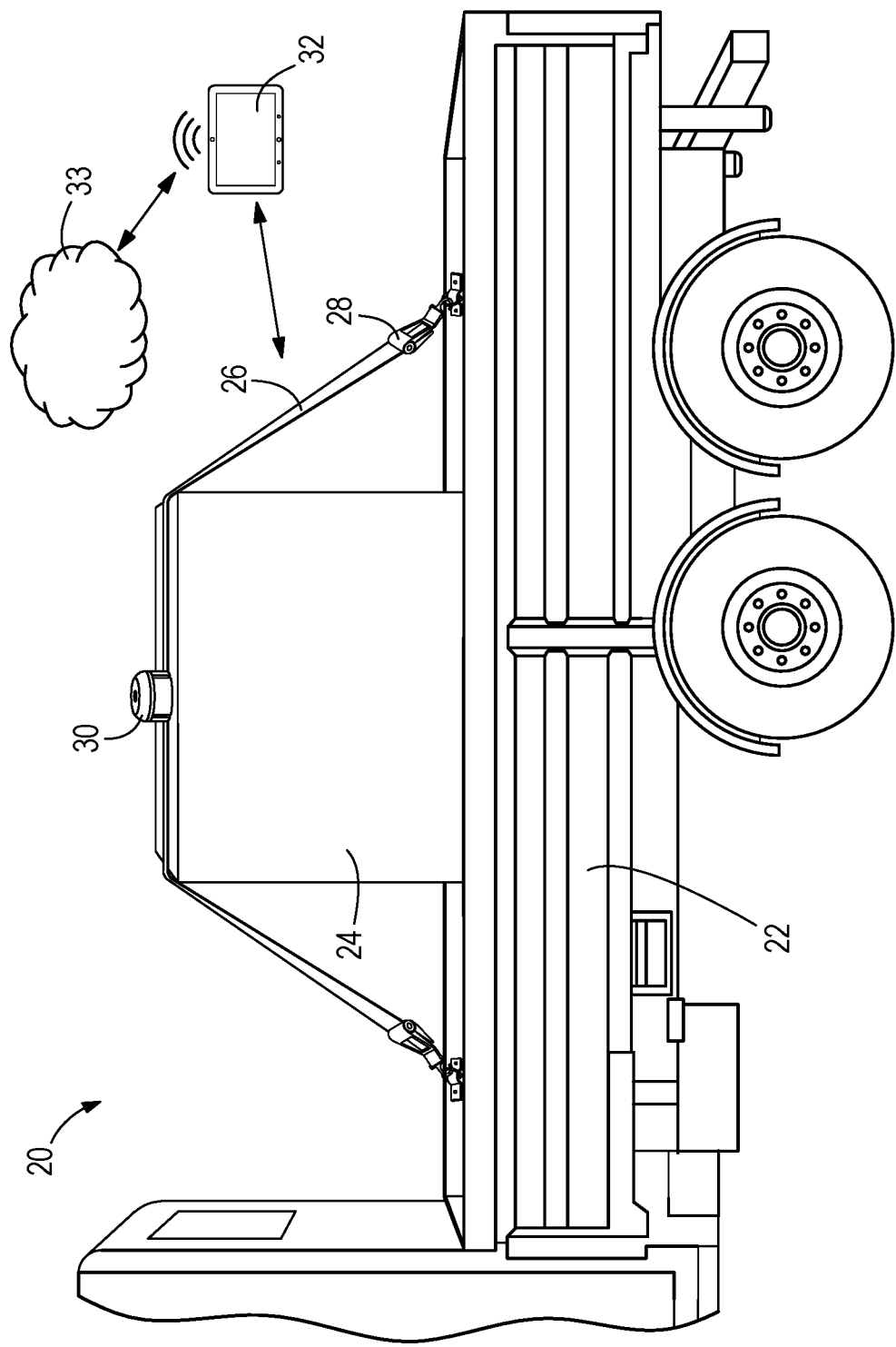
FIG. 1 is a perspective view of a tension monitoring system of the present invention.

FIG. 1 illustrates a tension monitoring system 20 in accordance with the present disclosure. A vehicle 22 is shown carrying a load 24. The load 24 is secured to the vehicle 22 with a cargo restraint such as strap 26. The strap 26 is put under tension with a tensioning device 28. A tension monitor 30 is attached to the strap 26. The tension monitor 30 is in wireless communication with a remote device 32 such as a laptop, mobile phone or an app running on a laptop or mobile phone. The remote device 32 can also be in communication with a remote location to gather and accumulate data such as cloud platform 33, however, other remote locations can also be utilized It should be noted that the vehicle 22 could include any type of transport device such as a truck, car, cart, ship, plane, train and like transport devices. The load 24 can include any type and shape of load and is not limited to the box as shown in the figures for exemplary purposes. As an alternative to the strap 26, the load 24 can be secured to the vehicle 22 using other types of cargo restraints such as chains, ropes, nets and like devices. The tension monitor 30 can be sized to accommodate and be used with a wide variety of straps including straps of varying thicknesses, material types and widths. The load cell 42 can be of multiple load cell types and capacities including S-bar, compression, bridge and tension types.

Figure 2:
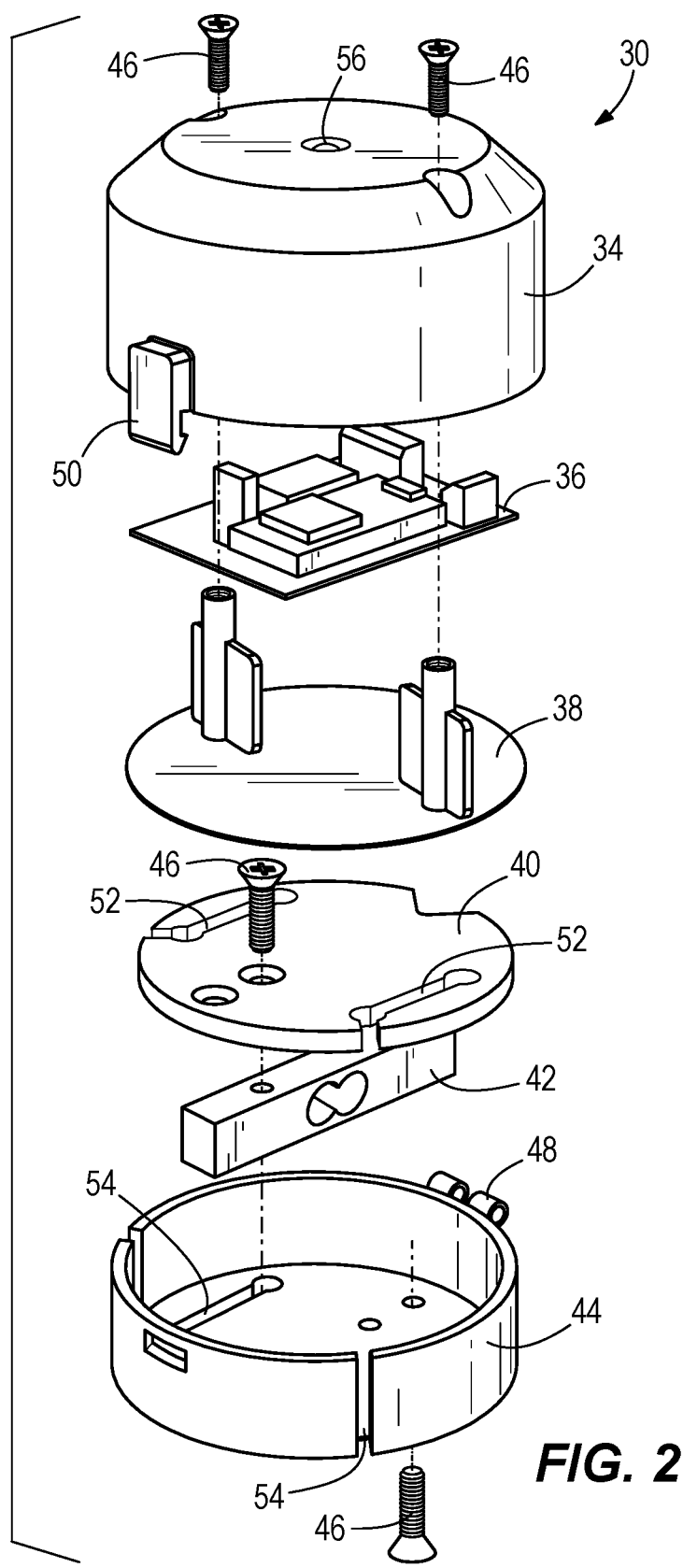
FIG. 2 is an exploded view of a tension monitor.
Figure 3:
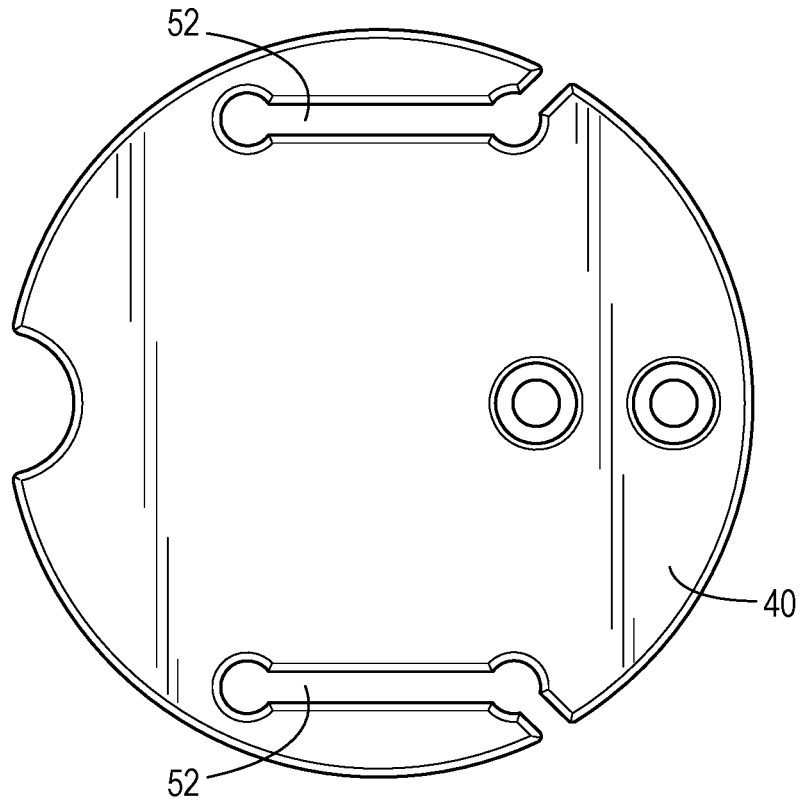
FIG. 3 is a bottom view of a pressure plate.

Turning now to FIG. 2, the tension monitor 30 is shown in an exploded view. The tension monitor 30 preferably includes a top housing 34, a processor module 36, a support structure 38, a pressure plate 40 (also shown in FIG. 3), a load cell 42, a bottom housing 44, fasteners 46, a hinge 48 which enables the top housing 34 to move relative to the bottom housing 44, a lock 50, channels 52 in the pressure plate 40, channels 54 in the bottom housing 44, and a visual indicator 56 in the top housing 34. The visual indicator 56 is preferably a light that is capable of green, yellow and red lighting. It should be noted that an alarm can also be used in place of or in addition to the visual indicator 56 to notify the user of the status of the strap 26 and/or tension monitor 30. The tension monitor 30 can also include a digital display (not shown) to display status, strap tension and other indicia as desired.

Figure 4:
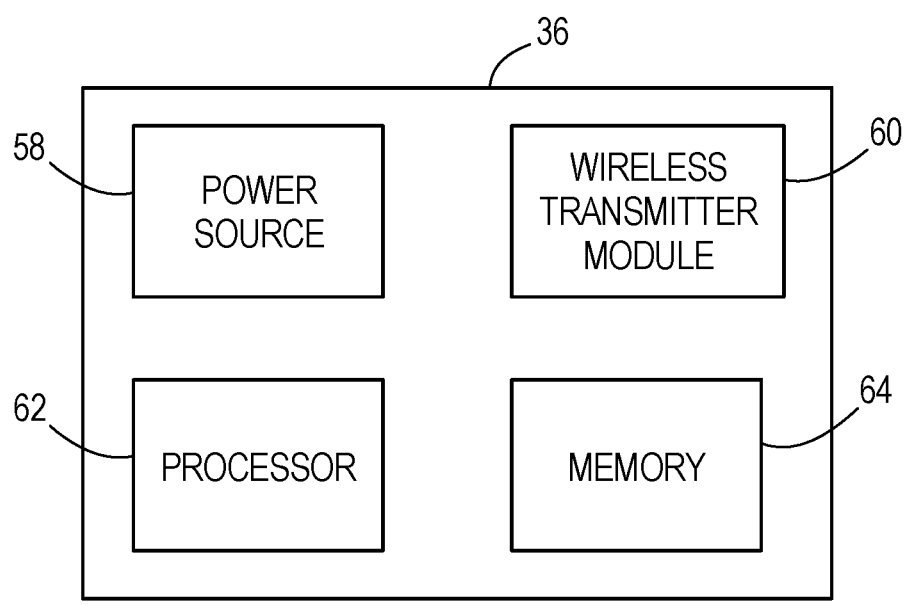
FIG. 4 is a schematic view of a processor module.

As shown in FIG. 4, the processor module 36 includes a power source 58, a wireless transmitter module 60, a processor 62 and memory 64. The wireless transmitter module 60 can operate on a variety of modalities such as RF, Bluetooth, WiFi, cellular and like technologies. The tension monitor 30 includes the hardware needed for such wireless communication such as antennas, software and the like as is known in the art.

Figure 5:
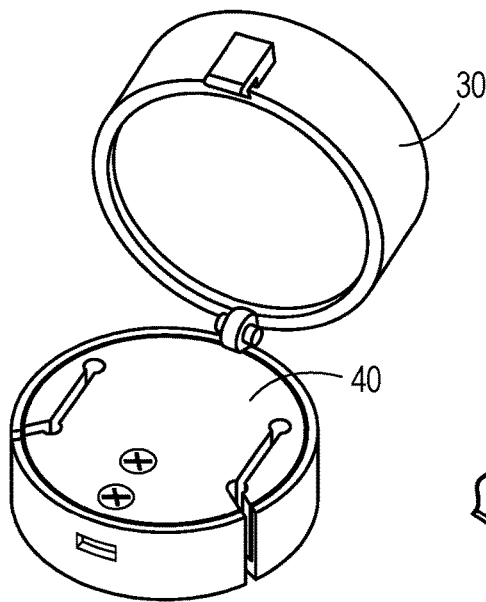
FIG. 5 is a perspective view of attaching the tension monitor to a strap.
Figure 6:
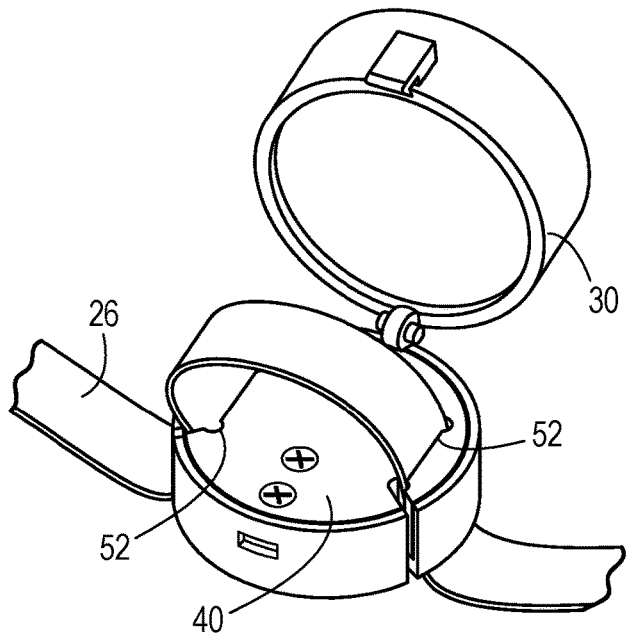
FIG. 6 is a perspective view of attaching the tension monitor to the strap.
Figure 7:
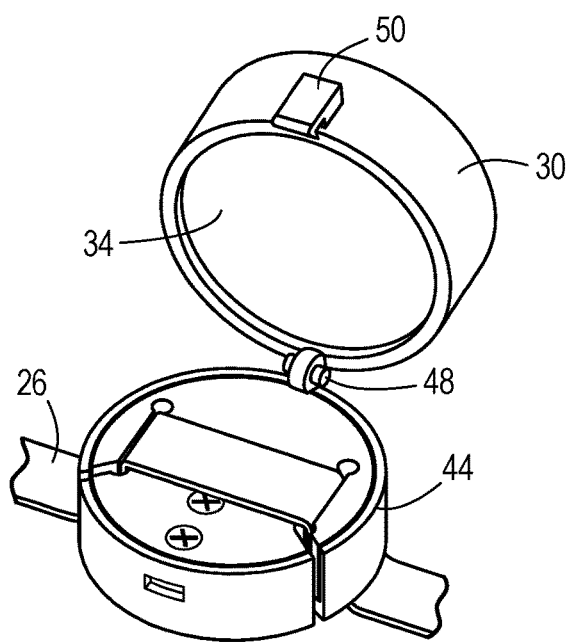
FIG. 7 is a perspective view of attaching the tension monitor to the strap.
Figure 8:
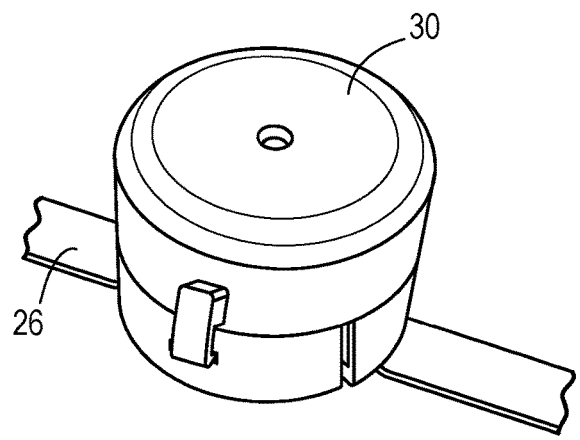
FIG. 8 is a perspective view of attaching the tension monitor to the strap.
Figure 9:
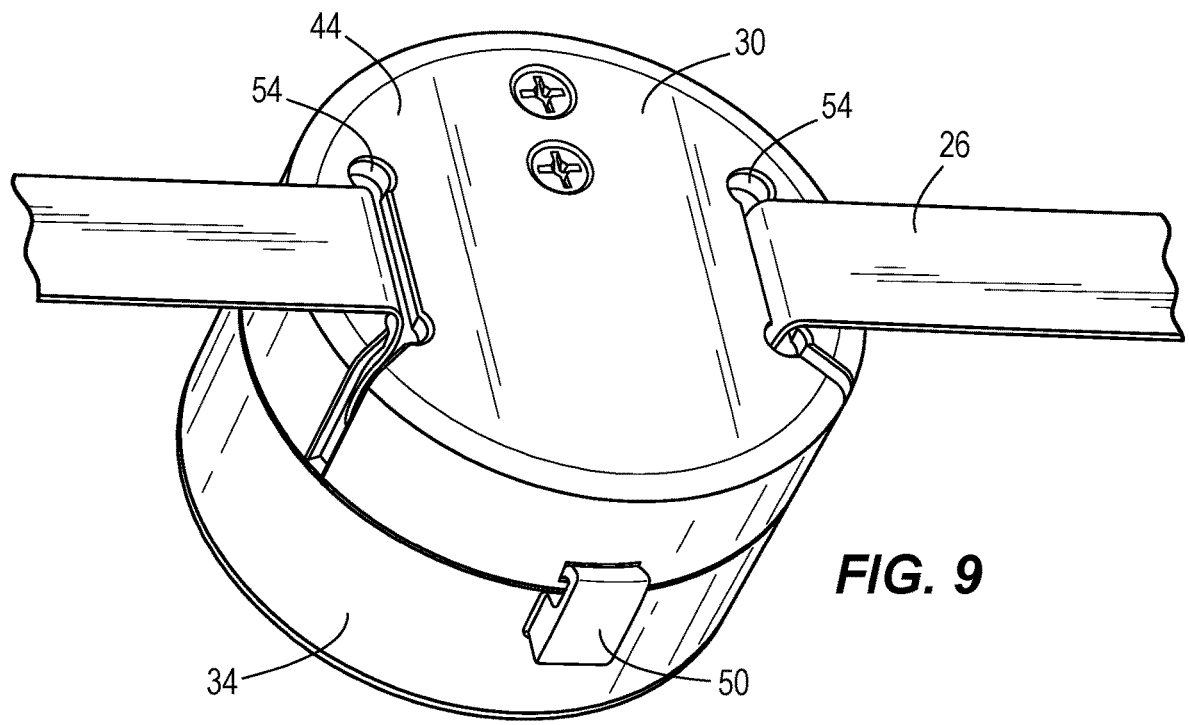
FIG. 9 is a perspective view of attaching the tension monitor to the strap.

With reference to FIGS. 5-9, the attachment of the tension monitor 30 to the strap 26 is shown. In FIG. 5, the tension monitor 30 is in its open position such that the pressure plate 40 is assessable. In FIG. 6, the strap 26 is fed upwardly through channel 54 (blocked in this view) then channel 52 on one side of the tension monitor 30, across the pressure plate 40, then downwardly through channel 52 then channel 54 (also blocked in this view). In FIG. 7, the tension monitor 30 is moved into its closed position such that the top housing 34 is moved about the hinge 48 to be adjacent the bottom housing 44 and be held in that closed position via lock 50. In FIGS. 8 and 9, the tension monitor 30 is in its closed position and ready for use.

Figure 10:
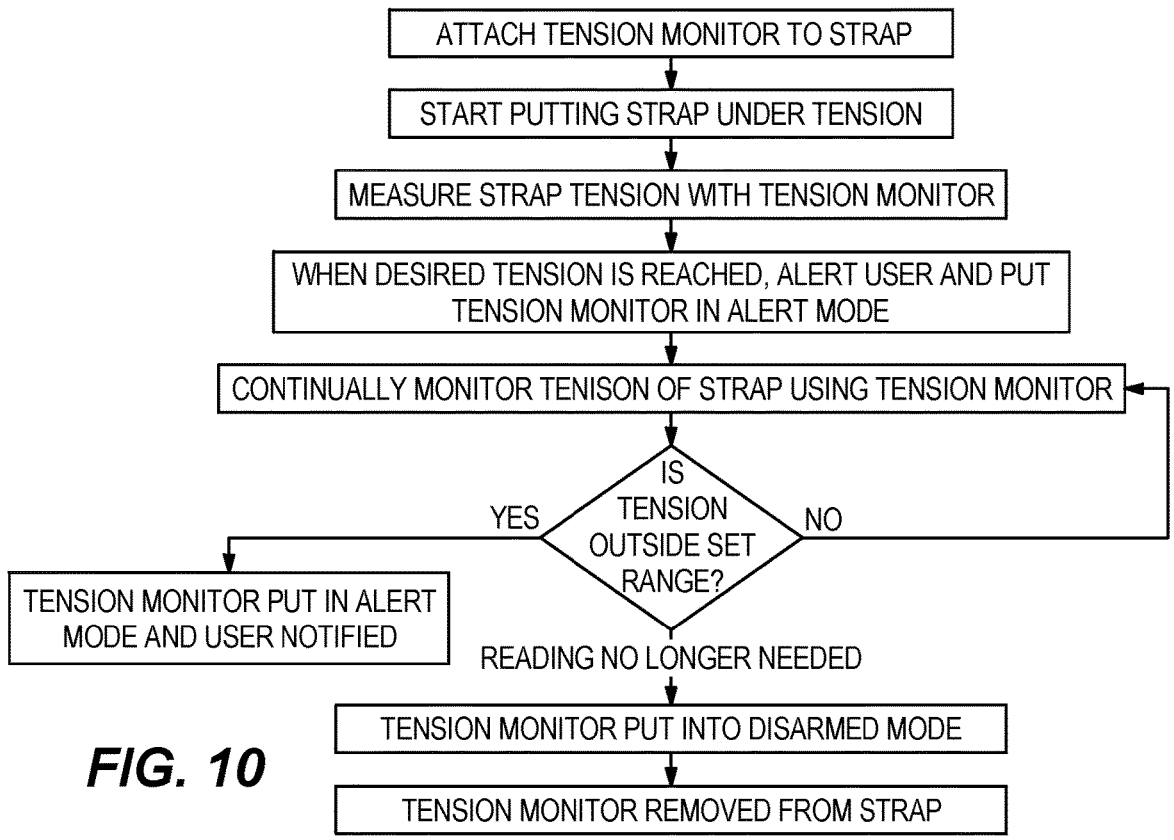
FIG. 10 is a flowchart of the operation of the tension monitoring system.

Turning to FIG. 10, the operation of the tension monitoring system 20 is described. The tension monitor is attached to a strap as described above. The strap is put under tension using the tensioning device. While the strap is being put under tension, the tension monitor is wirelessly communicating the current tension of the strap to the remote device which is preferably displaying the current tension reading to a user. The load cell in conjunction with the pressure plate measure the tension of the strap as is known in the art of load cells. Once the strap has reached the desired or pre-set tension setting, the tensioning device is stopped, and the tension monitor is put into armed mode via communication with the remote device. In this armed mode, the visual indicator is preferably a green light indicating to the user that the strap and load are secure.

If at any time the tension of the strap as measured by the tension monitor changes outside of a user inputted or pre-set high, low or range, such as a high and low tolerance setting, the tension monitor goes into alert mode and wirelessly sends a notice to the remote device to alert the user or another designated entity. The visual indicator is preferably a red light in alarm mode to also alert the user. Alternatively, the tension monitor can periodically send tension readings and/or any change in tension readings to the remote device and the remote device can determine whether or not the user or designated entity should be alerted to the change based upon inputted or preset parameters.

When the load is to be unloaded and the strap loosened, the tension monitor is put into a disarmed mode via a communication from the remote device to avoid any false tension change communications. The visual indicator is preferably a yellow light in this disarmed mode. Optionally, the strap can include a strap lock (not shown) that would require entering an unlock code before the strap could be removed from the tension monitor. This would prevent unauthorized removal of the load from the vehicle.

The tension monitoring system 20 allows for cargo restraints such as straps 26 to be tensioned to a desired level with a user inputted or pre-set value or high/low tolerance level range of acceptable tension readings which can be based upon the type of load 24 being transported, allows for informing the user or designated entity of the initial armed mode tension reading, and allows the user or designated entity to be notified should the measured tension readings vary outside the inputted or pre-set values. For example, a flatbed vehicle with a load of lumber may include multiple tension monitors 30. If during transport of the lumber, the lumber shifts, tension will likely loosen on some straps and increase on others. The tension monitoring system 20 has the ability to monitor both under and over tensioning situations and has the ability to analyze the changing tensions of the lumber to determine and to warn the user of a potential rollover situation.

The remote device 32 wirelessly communicates with the tension monitor 30. The remote device 32 can control the functioning of the tension monitor 30 such as arm/disarm/alert, display of current strap tension reading, setting of tension tolerance values and/or ranges and acting as an alert indicator. The user or designated entity can set the preferred tension settings and/or range tolerances using the remote device 32. Other information can also be wirelessly communicated to or inputted into the remote device 32 such as identification data of the strap 26, use logs for the straps 26, average tension for the straps 26, loss of tension events and like information.

FIG. 11 illustrates the tension monitoring system 20 used with a plurality of loads 24 enclosed in vehicle 22. The tension monitors 30 are attached to the straps 26 and can communicate with the remote device 32 and cloud platform 33 via a gateway 68 and/or cellular antenna 70 as needed.

Figure 13:
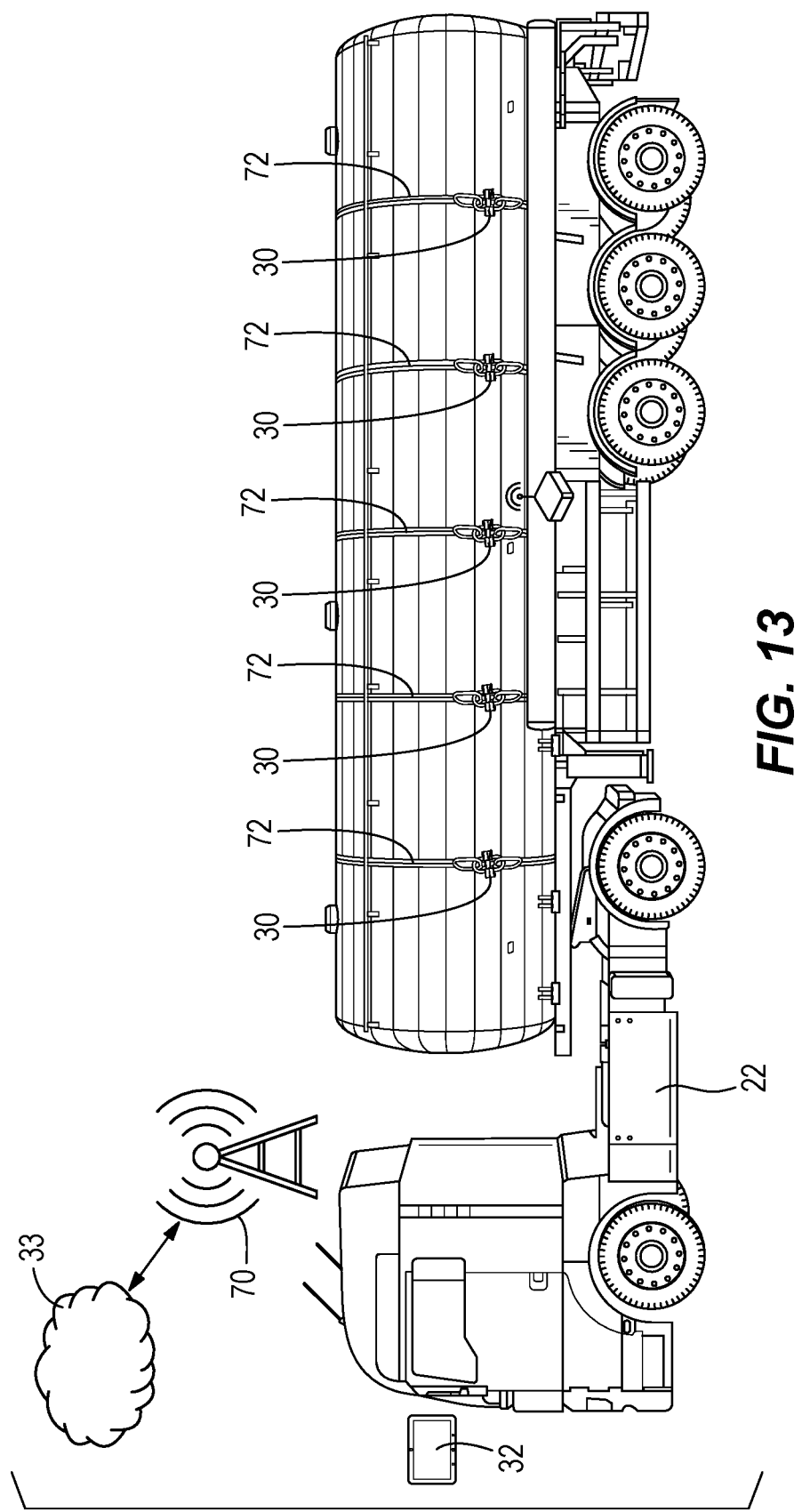
FIG. 13 is a perspective view of the tension monitoring system used with the chain type cargo restraint.

With reference to FIG. 12, the tension monitor 30 is used with a chain type cargo restraint 72. A short strap 74 is utilized to be fed through the tension monitor 30 and attach to the two chain links 76 and 78. FIG. 13 illustrates the tension monitors 30 and the chains 72 being used with a vehicle 22 that is a tanker type vehicle.

Figure 14:
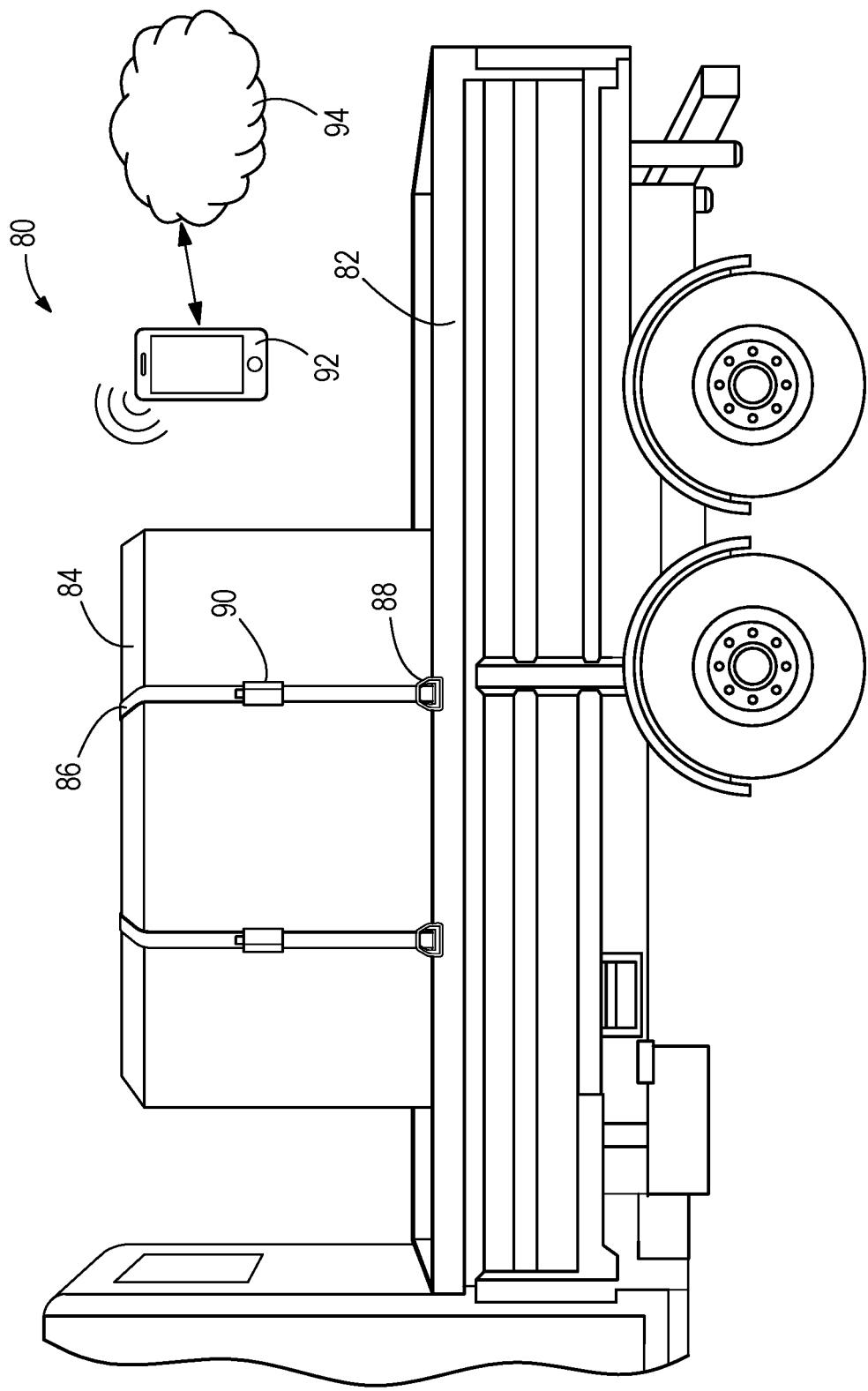
FIG. 14 is a perspective view of a cargo restraint lifecycle monitoring system.

Turning now to FIG. 14, a cargo restraint lifecycle monitoring system 80 is illustrated. A vehicle 82 is shown carrying a load 84. The load 84 is secured to the vehicle 82 with a strap 86 and a tensioning device 88. A passive or active intelligent device 90 is attached to or embedded in the strap 86. The intelligent device 90 is in wireless communication with a remote device 92 such as a reader, laptop, mobile phone or an app running on a device.

It should be noted that the vehicle 82 could include any type of transport device such as a truck, car, cart, ship, plane, train and like transport devices. The load 84 can include any type and shape of load and is not limited to the box as shown in the figures for exemplary purposes. As an alternative to the strap 86, the load 84 can be secured to the vehicle 82 using other type of restraints such as chains, ropes, nets and like devices.

The intelligent device 90 preferably utilizes passive near field communication (NFC) technology such as an NFC chip available from Atlas RFID Store. It should be noted that other active and/or passive wireless technologies can also be utilized such as RFID (active and/or passive) and Bluetooth beacons. The intelligent device 90 can be embedded or attached to the strap 86 at the time of manufacture or at any time post manufacture. At the time of attachment or embedding, the intelligent device 90 is programmed or written to with appropriate initial data such as strap serial number, manufacturer part number, manufacturer, manufacture date, max/working load specifications, material type, width, planned routes, owner and any other desired data. The remote device 92 can be used for such programming.

The remote device 92 has the ability to read the initial data on the intelligent device 90 and preferably transmit that initial data to a remote storage location such as cloud platform 94, however, other storage locations can also be utilized. The cloud platform 94 is utilized to gather, to tabulate and to analyze information relating to the strap 86 throughout its life and to provide alerts as to potential strap failure. The cloud platform 94 can also interface with other databases such as weather, terrain and color analysis, for example.

Figure 15:
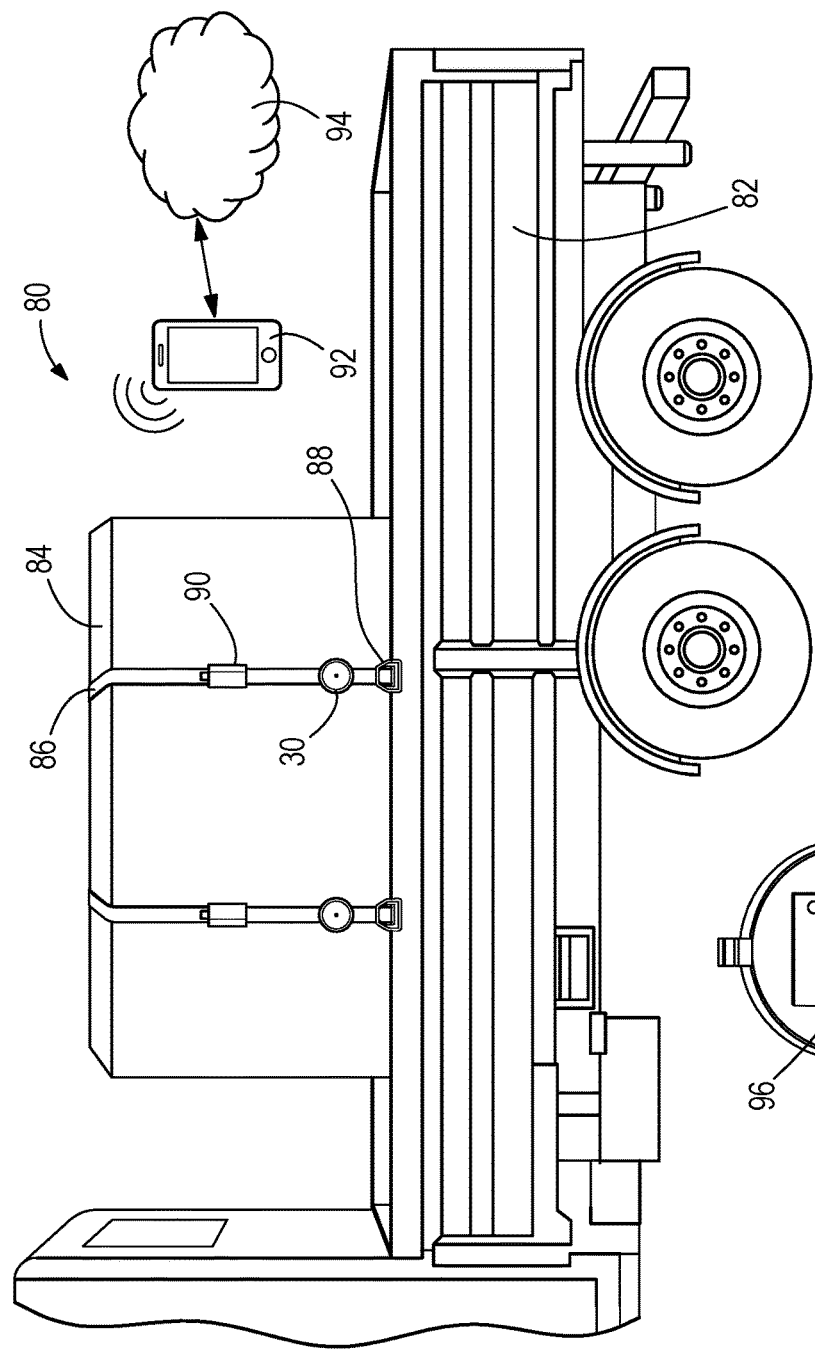
FIG. 15 is a perspective view of another embodiment of the cargo restraint lifecycle monitoring system.
Figure 16:
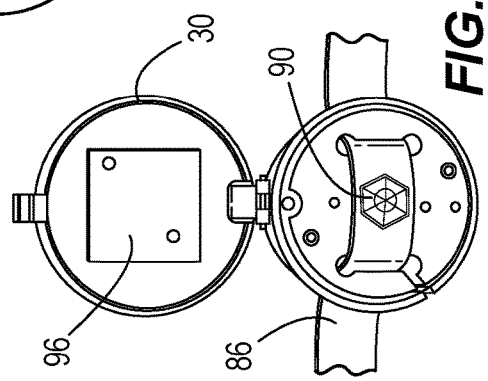
FIG. 16 is a top view of a tension monitor with a reader.
Figure 17:
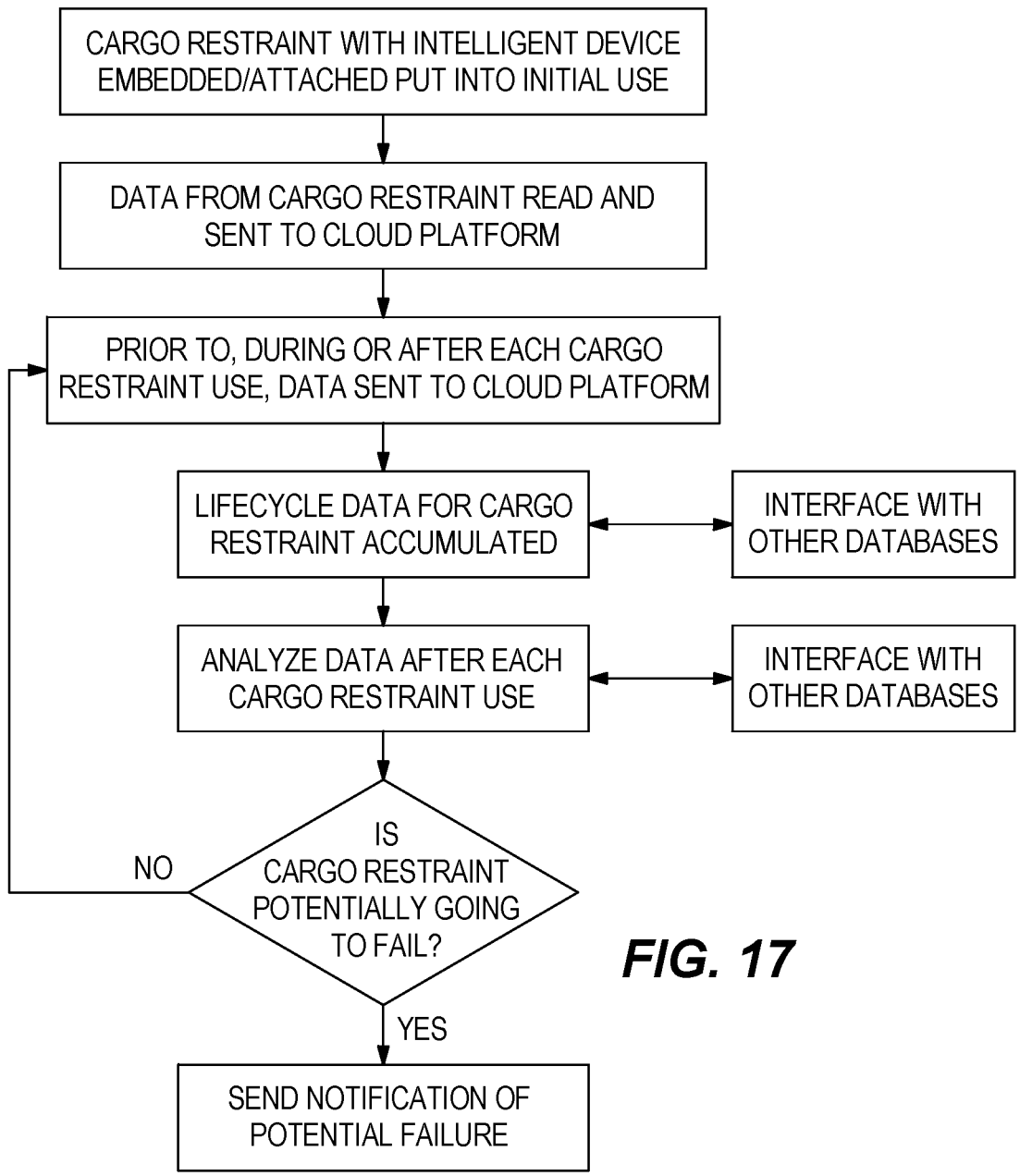
FIG. 17 is a flowchart of the operation of the cargo restraint lifecycle monitoring system.

In a second embodiment as shown in FIGS. 15 and 16, the tension monitor 30 can be utilized to read and/or write the initial data to and from the intelligent device 90. The tension monitor 30 can be outfitted with NFC read/write capability such as reader/writer 96.

The cargo restraint lifecycle monitoring system 80 is designed to use an intelligent device attached to or embedded in a cargo restraint for the purpose of gathering initial data and gathering usage data of an individual cargo restraint for the purpose of monitoring its uses or lifecycle and managing the cargo restraint lifecycle. By gathering information on each use of a cargo restraint, the lifecycle of an individual cargo restraint can be tracked and monitored such as before and after each cargo restraint use. Use information of a cargo restraint can be gathered prior to, during and at the end of each use and can include usage data such as, for example, date, location(s), maximum tension, minimum tension, length of time under tension, any loss of tension during use, tension applied initially and throughout each use. Additionally, the lifecycle monitoring system 80 can include the ability to identify location of each use, utilize external source data (such as route, weather along route, terrain, etc.), strap color change as a result of environment, and other available data to assist in monitoring usage and determining potential strap failure. The ability to write information to the intelligent device can also be utilized such as writing time/date/location of initial use.

Turning now to FIG. 16, the operation of the cargo restraint lifecycle monitoring system 80 is shown. When the cargo restraint with intelligent device embedded or attached is put into its initial use, the initial data from the intelligent device is read by the reader or remote device and send to the cloud platform. Thereafter, prior to, during and/or after each use of the cargo restraint, usage data is read by the reader or remote device and sent to the cloud platform. The cloud platform can accumulate the initial and usage data for user review and/or printing which can include data from other databases. Analysis of the accumulated data can also be done by the remote device and/or the cloud platform and other databases are interfaced with as needed. Such analysis can include determining if/when a cargo restraint could potentially fail. If such a potential failure determination is made, an alert communication is sent to the user or designated entity.

Various features and advantages of the invention are set forth in the following claims.

What is claimed is:

1. A tension monitoring system for use with a cargo restraint and with a tensioner comprising:

a tension monitor separate from the tensioner including a housing, a fixed pressure plate, a load cell, a first channel and a second channel in the pressure plate, wherein the first channel and the second channel are oriented in the housing such that the cargo restraint can be fed into the housing through the first channel, across the pressure plate, and exit the housing at the second channel, the pressure plate and the load cell are adapted to determine a tension measurement relating to how much tension the cargo restraint is under; and a remote processor in wireless communication with the tension monitor and adapted to receive the tension measurement.

2. A method for monitoring tension of a cargo restraint comprising the steps:

providing a tension monitor having a housing including a tension sensor, a fixed pressure plate having at least one channel therein and a load cell, the housing having an open position wherein an interior of the housing is accessible and a closed position wherein the interior of the housing is not accessible;

feeding the cargo restraint through the interior of the housing through the at least one channel in the pressure plate and across the pressure plate when the housing is in the open position;

moving the housing to the closed position;

putting the cargo restraint under tension using a tensioner separate from the tension monitor;

measuring the tension of the cargo restraint with the tension monitor while using the tensioner;

sending a user an alert when a pre-set initial tension measurement is reached;

continually monitoring the tension of the cargo restraint with the tension monitor; and sending the user an alert if the measured tension of the cargo restraint is outside a pre-set range.

3. A tension monitor for use with a cargo restraint comprising:

a first housing;

a second housing;

a fixed pressure plate including a first channel and a second channel oriented such that the cargo restraint can be fed into the second housing through the first channel, across the pressure plate, and exit the second housing at the second channel; and a fixed tension sensor;

where the first housing and the second housing are secured to and moveable relative to one another from a first position wherein the pressure plate is accessible and a second position wherein the pressure plate is not accessible.

4. The tension monitor of claim 3 wherein the tension sensor is a load cell.

5. The tension monitor of claim 3 and further including a lock to secure the first housing and the second housing in the second position.

6. The tension monitor of claim 3 wherein the first housing and the second housing are secured to and moveable relative to one another using a hinge.

7. The tension monitor of claim 3 and further including a processor.

8. The tension monitor of claim 3 and further including a visual indicator.

9. A method for monitoring tension of a cargo restraint comprising the steps:

providing a tension monitor having a housing with an interior a fixed tension sensor and a fixed pressure plate working together to measure tension;

feeding the cargo restraint through the interior of the housing;

putting the cargo restraint under tension using a tensioner separate from the tension monitor;

measuring the tension of the cargo restraint with the tension monitor while using the tensioner;

the tension monitor providing an armed alert when a pre-set tension measurement is reached indicating the cargo restraint is secure and ready for use;

continually monitoring the tension of the cargo restraint with the tension monitor;

the tension monitor providing a tension alert if the measured tension of the cargo restraint is outside of a pre-set range; and when the cargo restraint is no longer in use, the tension monitor providing a disarmed alert to avoid any false tension change readings.

10. The method for monitoring tension of a cargo restraint of claim 9 wherein the armed alert, the tension alert and the disarmed alert are visual indicators from an indicator mounted on the housing.

* * * * *